United States Patent

Friedman et al.

[15] 3,694,935

[45] Oct. 3, 1972

[54] RESPONSE SYSTEM WITH COMMON CIRCUITRY FOR MULTIPLE FUNCTIONS

[72] Inventors: David Friedman, Framingham, Mass.; Bernard Mortimer Segal, Binghamton, N.Y.

[73] Assignee: The Singer Company, New York, N.Y.

[22] Filed: Aug. 10, 1970

[21] Appl. No.: 62,280

[52] U.S. Cl. ....................35/48 R
[51] Int. Cl. ....................G09b
[58] Field of Search....................35/9, 48

[56] References Cited

UNITED STATES PATENTS 3,538,626 11/1970 Frank ....................35/48
3,500,559 3/1970 Jones et al. ....................35/48
3,577,657 5/1971 Plumly et al. ....................35/48

*Primary Examiner*—Robert W. Michell
*Assistant Examiner*—J. H. Wolff
*Attorney*—Francis L. Masselle and Charles S. McGuire

[57] ABSTRACT

An improved response and scoring system for use in teaching and testing apparatus which permits reducing the number of wires between a student's responder station and an instructor's console, provides simultaneous correct answer reinforcement on an individual or class basis, allows selective transfer of student response data to the common computational circuitry in a simple manner, and allows selected groups of student responses to be displayed on the instructor's console.

15 Claims, 7 Drawing Figures

RESPONSE SYSTEM WITH COMMON CIRCUITRY FOR MULTIPLE FUNCTIONS

This invention relates to electrically operated teaching and testing apparatus and more particularly to an improved response and scoring system which permits reducing the number of wires between a student's responder station and an instructor's console, and in other ways expands the capabilities of such systems at minimal cost.

The expansion in education and shortage of teachers has brought about a great need for devices which will enable an instructor to effectively teach greater numbers of students. One of the most effective types of such devices provides individual responders for each student, which responders are all connected to an instructor's console. Generally, each responder will have four or five separate response buttons which the student may press to indicate his selection of a proper response from a group of possible responses. Responders may be used to indicate comprehension of lecture material, in which case each button will signify a level of understanding (for example, one button might signify "-slow down"), or as a means of answering multiple choice questions during testing. In either case the responses are generally displayed to the instructor in some manner and may be permanently recorded for further analysis. In this way the instructor can monitor the performance of his class while lecturing or testing and make necessary adjustments as he goes along. He will also have permanent records useful in grading students and in finding which students require additional help.

Response data may also be used in automatic detectors which give the instructor an indication when correct responses of an individual student or of the class as a whole drop below a set minimum number or percentage of correct responses. In some cases responses are given weights and each response must be scored accordingly. Another important feature in such a system, where it is being used for teaching and testing through multiple choice answers, is correct answer reinforcement which lets a student know if he has selected the proper response and, if not, which response is the proper one. In some applications it is important that this correct answer reinforcement be simultaneous with the student's response.

From the foregoing, the need for simple means of storing a student response and transferring it to computational and recording circuits when desired is evident. When large numbers of students are involved, simple and effective means of accomplishing these objectives are desired to make a system more economical.

Some previous systems of this type have employed mechanical, relay or flip flop latching means, none of which provide the ability for simultaneous answer reinforcement on an individual basis and all of which require a separate wires for indicating the correct answer. Another method used is voltage divider or current sharing means which require carefully regulated sources and use relatively expensive discrete components.

The present invention solves these problems by providing a system which allows all the desired functions to be performed in a simple and economical way. By novel employment of time sharing techniques, simultaneous answer reinforcement is possible and wiring is reduced to a minimum both in respect to connections between the console and the responders, and internally within the console. In addition, increased flexibility and the ability to add to the system easily are provided.

The principal object of this invention is to provide a teaching and testing system which will permit simultaneous answer reinforcement to the student, i.e., when the student selects one of a number of possible multiple choice responses on his responder, simultaneously with his selection, the correct answer will appear and both his response and the correct answer will remain displayed, using minimum of components.

Another object is to provide a simpler and improved means of transferring student response data to the common computational circuitry.

Another object is to allow selection of the groups of student responses to be displayed on the instructor's console utilizing simplified circuit and wiring means.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
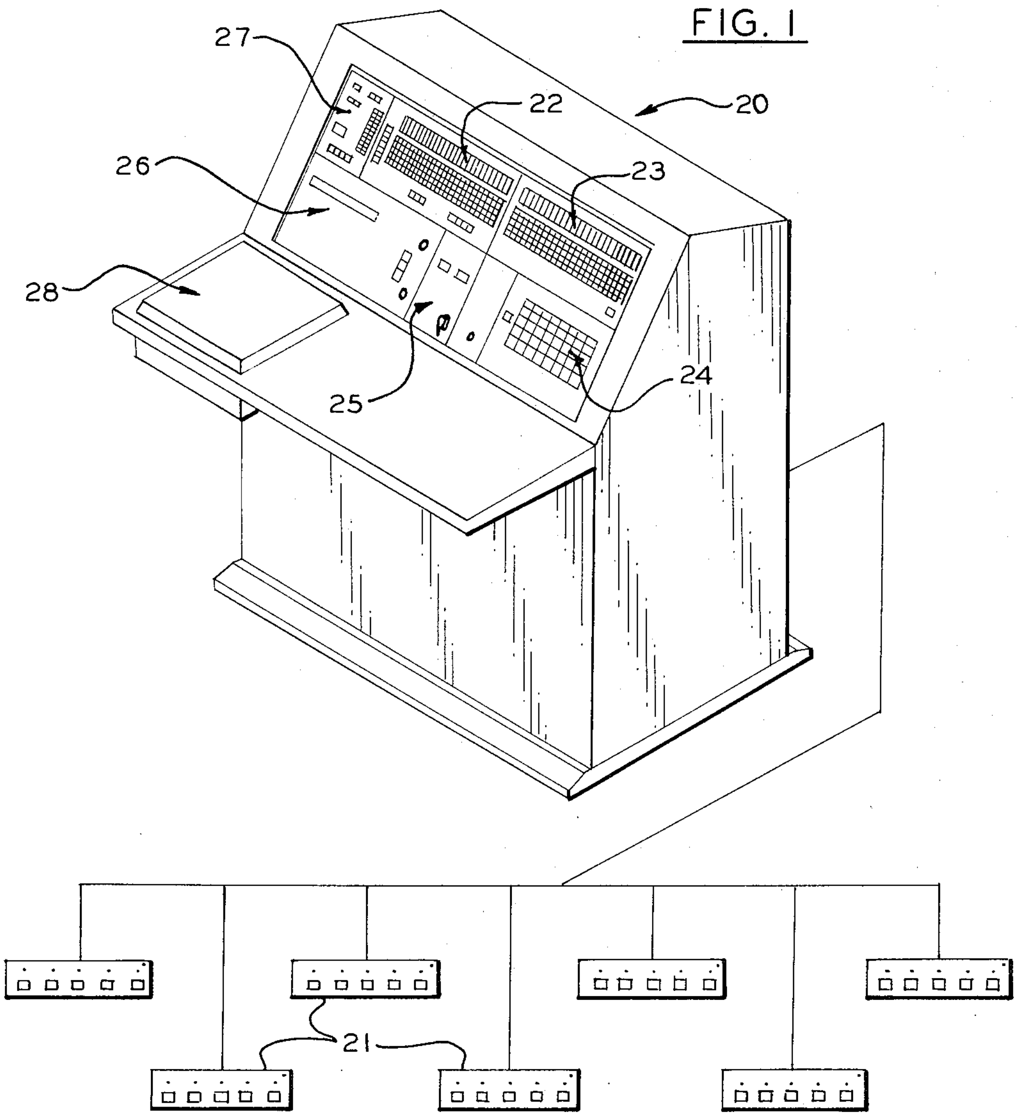
FIG. 1 is a pictorial view of the system comprising an instructor's console and student responders.

FIG. 1 shows a teaching and testing system, which includes instructor's console 20 and remote student responders 21, where the present invention may be used. Panels 22 and 23, shown in more detail in FIGS. 2 and 3 contain indicators through which the instructor may monitor student responses and controls for the instructor to operate the response system. Panel 24 is a control panel for operating ancillary equipment such as motion picture and slide projectors which may be used in teaching and testing presentation. Panel 25 is a response summary panel which indicates the number of students responding and the percent selecting a certain response. Controls for programming a tape recorder 28 are contained on panel 26. Any of the functions, such as control of the ancillary equipment and control of the response system, which can be performed manually from the panels may also be programmed on tape to provide a pre-programmed lesson or test. Panel 27 contains the controls for assigning weights to each response and for selecting a minimum percentage score to be compared with individual student percentage scores when the instructor desires to do so, at which time and indication will be given to the instructor of each student falling below the selected minimum by lighting one of the instructor's indicators associated with the student.

Figure 4:
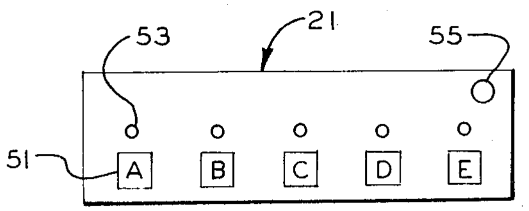
FIG. 4 illustrates one exemplary form which the face of the student responder may take.
Figure 2:
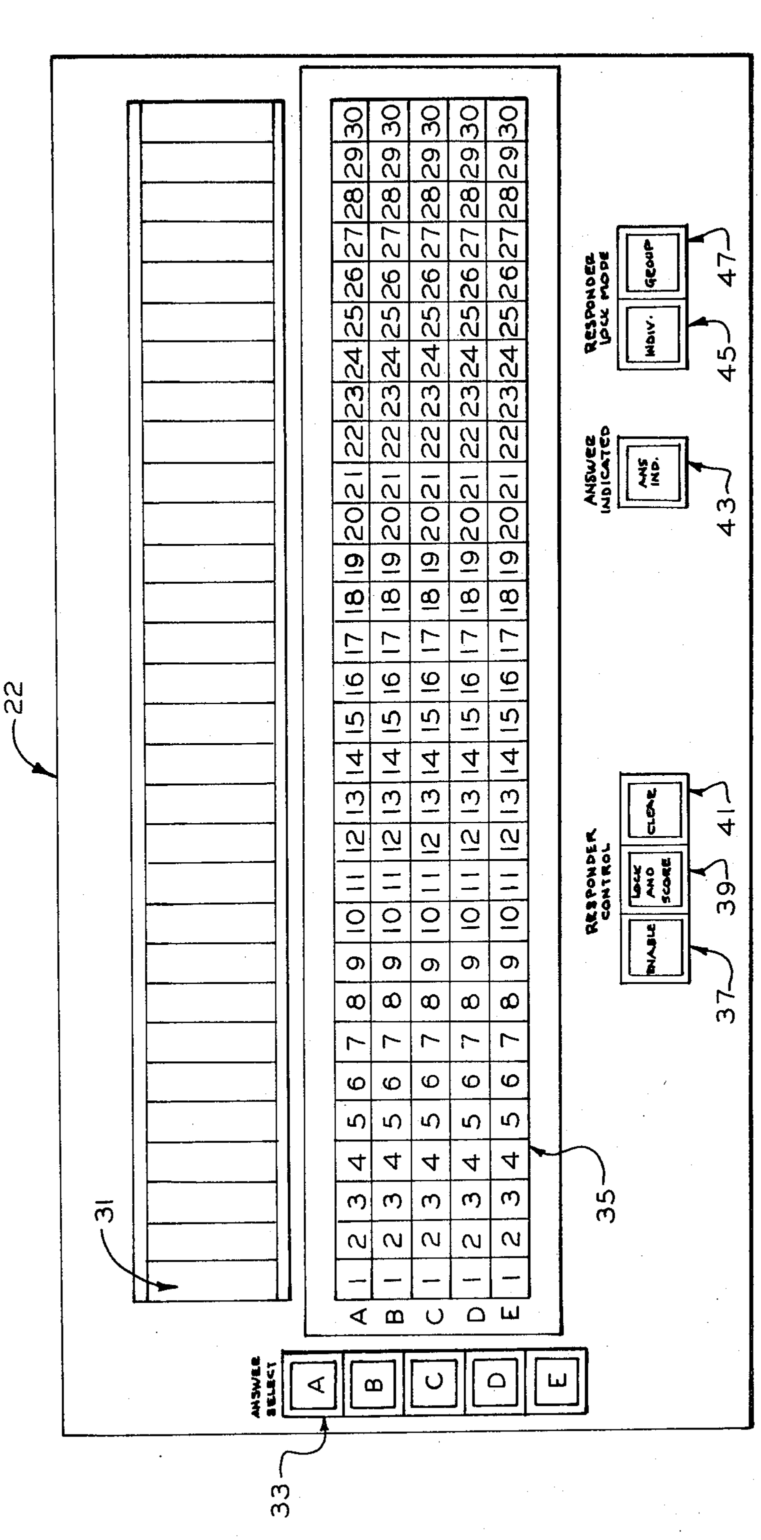
FIGS. 2 and 3 illustrate an embodiment of two portions of the face or display portion of the instructor's console of FIG. 1.
Figure 3:
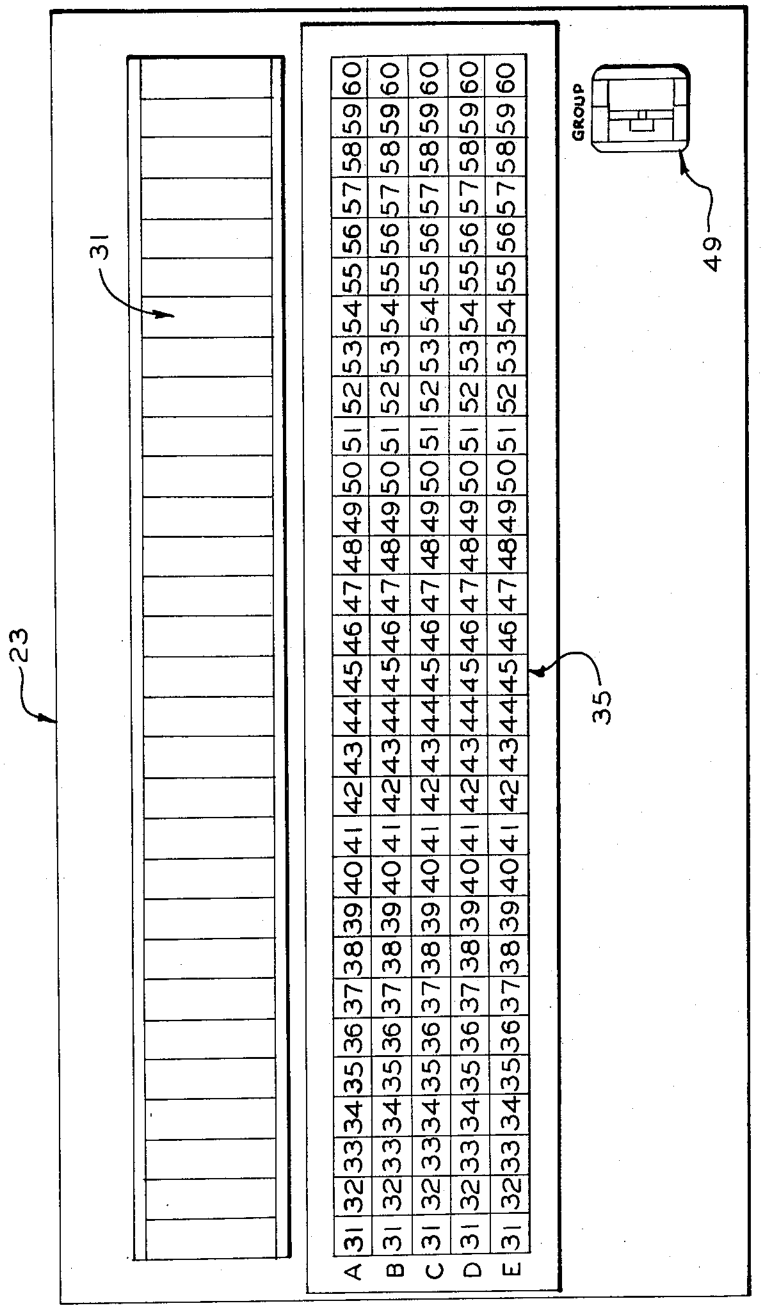

A better understanding of the use of the response system may be had by referring to FIGS. 2, 3, and 4. FIG. 2 shows the instructor's individual student response indicators 35 which indicate to the instructor which response has been selected by each of the students in the group. 30 columns of lights are arranged in rows representing the possible responses. Above each column of indicators is a position 31 for placing a student's name. Also on this panel are the controls associated with correct answers and answer reinforcement. By use of answer selector switches 33 the instructor may select one of the possible responses as the correct answer. Answer indicator switch 43 is an alternate action switch which allows the instructor to display or not display the correct answer to the students, as desired. The responder lockmode controls 45 and 47 determine whether the students may change answers or not during the time allowed for response and, if the correct answer is to be indicated to the students, as determined by switch 43, the lockmode controls determine when this will occur. One or the other of the two switches, individual mode 45 or group mode 47, will be selected. In individual mode the student has only one chance to answer the question and, if answers are to be indicated, the correct answer will be displayed to him simultaneously with his selection. In the group mode the student may change answers until the lock and score switch 39 is pressed and, if answers are being indicated, the display of correct answers will not occur until this lock and score switch is pressed. The clear switch 41 clears any previous responses stored within the system. Enable switch 37 is used to enable the student responders when the instructor desires to obtain responses from the students.

The panel in FIG. 3 is basically an extension of the panel in FIG. 2 containing indicators for an additional 30 students. The one additional function presented is a group selection switch 49 which allows the system to be used with more than 60 responders at a time. When more than 60 responders are used they are divided into groups of 60 and each group is assigned a number. For example, group 1 would be responders 1–60, group 2,61–120, etc. By selecting the desired number on switch 49 (shown in the form of a thumbwheel or a digiswitch) the instructor may select one of these groups to be displayed.

FIG. 4 shows a responder 21 containing switches 51 used by the student to indicate his response, indicator lamps 53 on which his last selected response and, under the proper conditions, the correct answer are indicated, and ready indicator 55 which will flash for a few seconds after the instructor has enabled the responders.

As enable switch 37. At this indicated, the response system may be operated either of two modes under selective control of the instructor by pressing either individual mode switch 45, or group mode switch 47. In group mode the instructor will first press the enable switch 37. At this time light 55 on the responder will flash for a few seconds indicating to the student that the responder is activated. The student is then presented with a situation requiring a response which he selects by pressing one of the switches 51. The indicator 53 above the switch pressed will then light, as will the corresponding indicator 35 on the instructor's panel 22 or 23. For example, if student "25" selects C then indicator 35 on panel 22 in row C numbered "25" will come on as will the indicator 52 above switch C on the responder of student "25." The student may change his selection if desired, with corresponding changes in both his indicators 53 and the instructor's indicators 35, until the instructor presses the lock and score switch 39. At that time the last response selected by each student is retained in the system, as will be described below and, if the instructor has preselected a correct answer by pressing one of switches 33 and has pressed the answer indicator switch 43, the preselected correct answer will flash on the responder of each student who has not answered correctly and the same flashing will be repeated on the instructor's indicators 35. If no correct answer has been selected, or if the answer indicator switch 43 is not on, then the student will have no correct answer reinforcement. In individual mode, the instructor generally selects a correct answer by pressing one of switches 33 prior to pressing enable 37. In this mode the student gets only one chance at responding. As soon as one of switches 51 is pressed, the responder is disabled and his selection appears simultaneously with a flashing correct answer, if his is not the correct one, on his indicator 53. Again, if the instructor does not desire the student to have correct answer reinforcement, as might be the case in a test, he will keep switch 43 off.

Figure 5:
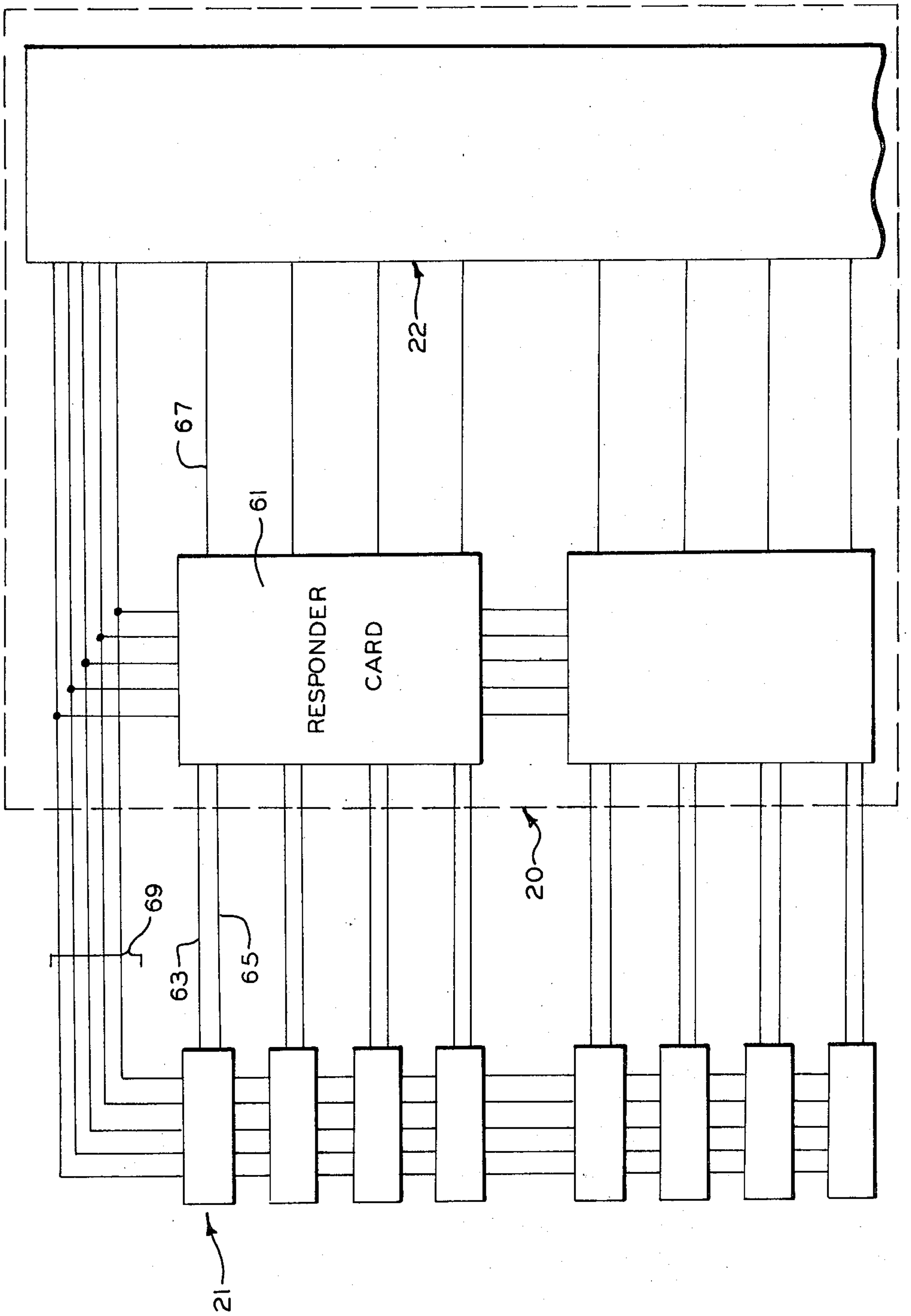
FIG. 5 is a block diagram useful in understanding the interconnections in the system.

The novel manner in which this is accomplished may be seen by reference to the remaining figures. FIG. 5 shows in block diagram form the connection between the responders 21 and the instructor's response display 22 through responder cards 61 which contain the logic for the responders and which will be described in more detail below. As is shown, only two individual wires, an input wire 63 and an output wire 65, are required between responder card 61 (located in console 20) and the individual responders. Additional wires 69 of a number equal to the possible number of responses are bussed to groups of responders, to the responder cards 61 and to the instructor's indicator panel 22 as shown. Likewise, only one wire 67 per responder is required to transmit data from cards 61 to the instructor's response display 22 and other parts of the system.

Figure 6:
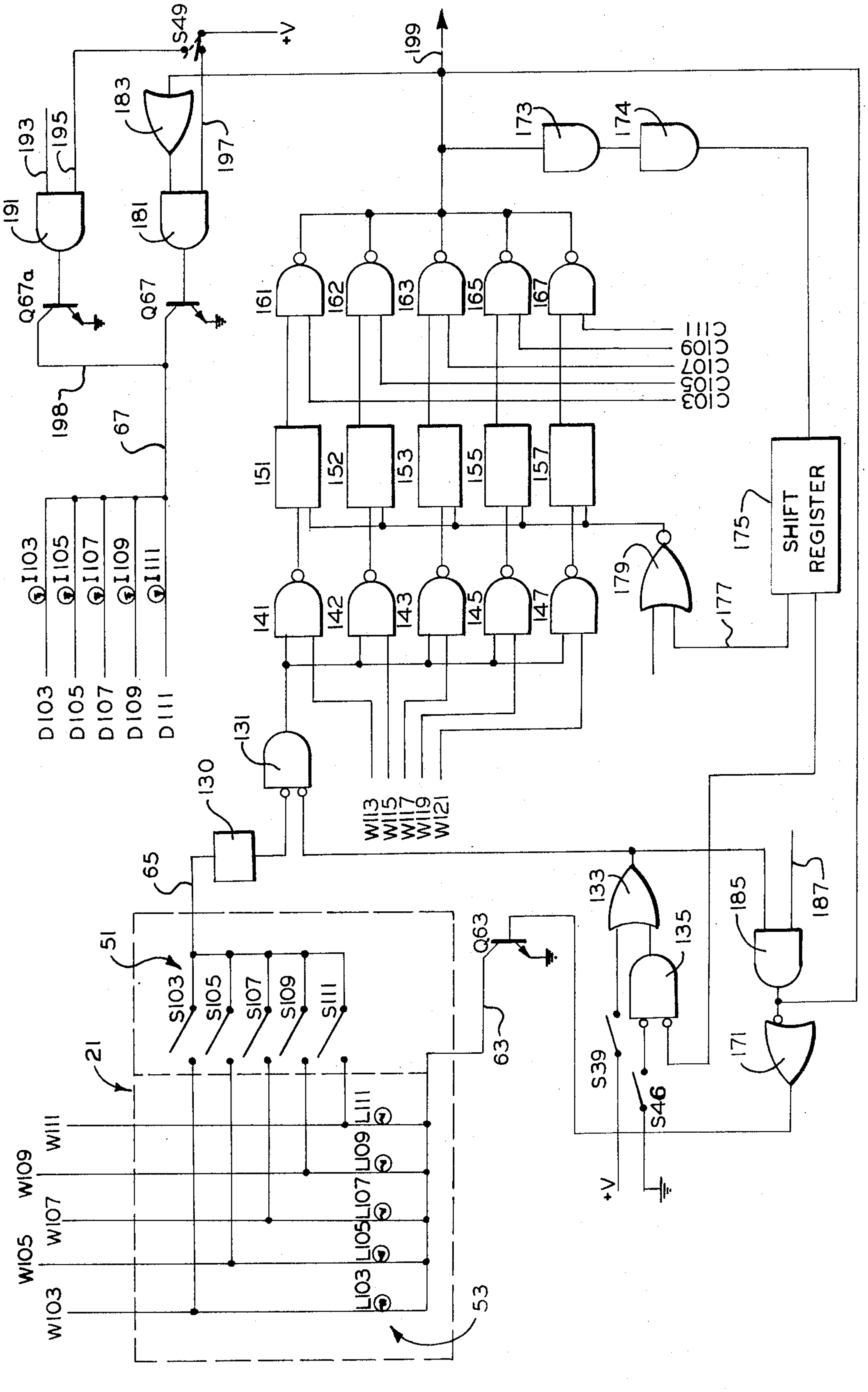
FIG. 6 is a logic diagram illustrating an embodiment of the invention in detail; and, FIG. 7 is a timing diagram helpful, in connection with FIG. 6, to an understanding of the illustrated embodiment of the invention.
Figure 7:
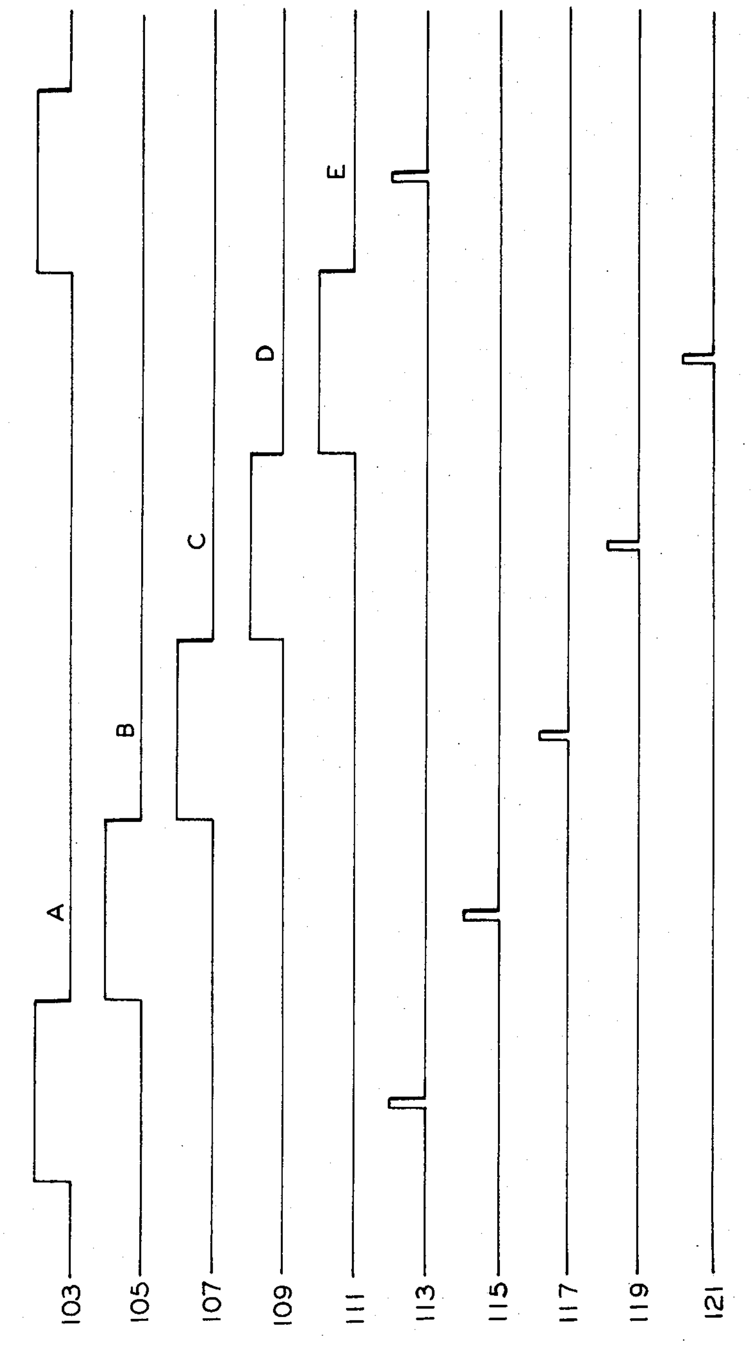

FIG. 6 shows a simplified logic diagram of one student's response circuit, and FIG. 7 shows the timing associated with it. By examining these together it will be possible to see how the desired results are obtained using so few wires, by means of multiplexing or time sharing.

The pulses shown on FIG. 7 are generated by a pulse generator having a frequency of, for example, 500 $KH_z$, and associated counters (not shown). The basic clock frequency of 500 $KH_z$ from the pulse generator is counted down and after a predetermined time increment, e.g., every 128 counts (256 microseconds), one of the pulses 103, 105, 107, 109 or 111 will go off and the next one come on. Each pulse will remain on for 128 counts, at which time it will go off and the next pulse will come on. The pulses 113, 115, 117, 119, and 121 consist of one clock pulse in the middle of "on"

time of an associated one of pulses 103, 105, 107, 109 and 111.

The operation of the logic in FIG. 6 may best be explained by some examples of how it operates in the different modes. During the time when students may respond in group mode, S39, associated with lock and score switch 39 on FIG. 2, will be open and, with group mode selected by pressing switch 47 on FIG. 2, S46 will be open. (The open position of S46 corresponds to switch 47 being pressed and the closed position to switch 45 being pressed.) Gate 135 is an AND gate with inverted inputs. Only with both inputs at ground will it have a high output. (For the purpose of this discussion the words "ground" and "high" will be used to represent the two logical states possible in the operation of the logic circuits involved. Grounds may be thought of as an "OFF" or "O" condition and high as an "ON" or "1" condition.) Since one of the inputs to gate 135 is from switch S46, the gate cannot have a high output until that switch is closed to ground. The output of switch S39 is an input to OR gate 133. This type of gate will have a high output when either of its inputs are high. Since switch S39 is open and the output of gate 135 is a ground, neither input to 133 is high and its output will be ground. This output is one of the inputs to gate 131. The other input to gate 131 comes from noise immunity circuit 130, which is basically a transistor inverter. Gate 131 is also an AND gate with inverted inputs. Only if both inputs are at ground will the output be high. In the present example, as just explained, the input from gate 133 is a ground; thus, the output of gate 131 will be high whenever the input thereto from noise immunity circuit 130 is ground. With all of the student response switches 51 in the open position as shown, there will be an open input to the noise immunity circuit 130, and the output will be high. When a student presses one of his switches 51, for example, S103, then during the times when the voltage on W103 (corresponding to 103 on the timing diagram of FIG. 7) is high, the output of noise immunity circuit 130 will become a ground and the output of gate 131 will be high. This output is one input to gates 141, 142, 143, 145 and 147, all of which are NAND gates. The operation of these gates is such that when both of the inputs are high their output will be a ground. Therefore, if a high appears on the second input of any of gates 141, 142, 143, 145 or 147 during the time that the output of gate 131 is high a ground will appear on the output of that gate. The other inputs of these gates are the wires W113, W115, W117, W119, and W121 which carry signals from the pulse generator corresponding to 113, 115, 117, 119, and 121 on the timing diagram, FIG. 7. Therefore, with S103 closed, a high will be on the first input of gate 141 at the time when a high appears on W113 and the output of gate 141 will go to ground during the time W113 is high. Since by the time the second inputs of gates 142, 143, 145 and 147 have highs on them from W115, W117, W119, and W121, the high from gate 131 on their first input (corresponding to 103 on FIG. 7) will have gone back to ground, the outputs of these gates will remain high.

The outputs of gates 141, 142, 143, 145 and 147 provide the inputs to set corresponding latches 151, 152, 153, 155, and 157. The second input to the latches is from OR gate 179 and is a reset signal. The latches 151, 152, 153, 155 and 157 consist of two gates. When the input to latch 151 from gate 141 goes to ground the output of the first of the two gates, an OR gate with inverted inputs, will go high. This is one of the two inputs to the second gate, a NAND gate, the other input being the reset line from gate 179. At times other than reset, the output of gate 179 will be high and when the other input from the first gate of the latch to the second gate of the latch goes high a ground will result on its output. This ground is then fed back as a second input to the first gate. Thus, when the signal from gate 141 goes back to ground the output of the first gate of the latch will remain high because of the ground from the second gate, thus causing a latching action. When it is desired to reset the latch, the high on gate 179 is removed and the output of the second gate in the latch goes high causing the output of the first gate to go to ground. Because of the high pulse frequency it is virtually impossible for the student to remove his finger from the switch before the above described chain of events occurs.

The output of latches 151, 152, 153, 155 and 157 are taken from the output of the first gate in the latch and provide inputs, respectively, to Nand gates 161, 162, 163, 165, and 167. The second inputs to these gates are provided, respectively, on C103, C105, C107, C109 and C111 which carry signals from the pulse generator corresponding to the same numbers on FIG. 7. In the present example, S103 is closed and latch 151 latched with a high output. Now each time a high appears on C103, both inputs of gate 161 will be high and a ground will result on its output. This output goes to gate 171, an OR gate with an inverted input. This gate will have a high output when its input is at ground. Hence, when the output of gate 161 goes to ground the output of gate 171 will go high and allow transistor Q63 to turn on. Keeping in mind that this only occurs during the time C103 is high, i.e., Q63 will be on only during the time 103 on the timing diagram is high, it can be seen that, when W103 goes high at this same time, L103 will light since it has a return path through Q63. Because of the repetition rate of the pulses, L103 will appear to stay on constantly.

Should the student change his answer, for example by closing S105, then latch 152 will latch in the same way 151 did when S103 was closed, and Q63 will now be on during the time of pulse 105. With no other action, both L103 and L105 would light. However, the output from the gates 161, 162, 163, 165, and 167 is also an input to shift register 175 after being gated through gates 173, and 174. (These last two gates have additional inputs, not shown, to perform functions not pertinent to this invention.) Shift register 175 consists basically of two flip flops. The input from gate 174 goes to both of these flip flops. The first flip flop will be set by any pulse but the second may only be set when a previous pulse has set the first flip flop. Each time the system cycles through the set of signals 103, 105, 107, 109, and 111 both flip flops are reset. Therefore, if only one answer has been selected, during each cycle only the first flip flop will be set. But in the present example, where an output is present during the time of 103 and another during 105, two pulses will occur during the cycle causing the second flip flop to set on the second pulse.

This output will appear as a high on line 177 an input to gate 179. This high on the input of gate 179 will cause its output to go to ground and all the latches will be reset as explained above. Because of the speed with which this occurs the students will not be able to remove his finger from the button for S105 before latch 152 is latched on the next cycle. Now with only one latch (152) set only the first flip flop in shift register 175 will be set on each cycle and latch 152 will not be reset, the return path through Q63 will occur during the time a voltage is on W105 and L105 will be lit. Although both lights L103 and L105 are on for one cycle it will appear to the student that, when he changes his selection by pressing S105, the first light went out and simultaneously the second came on.

The student's indication on lights L103, L105, L107, L109, and L111 is also shown on the instructor panel lights I103, I105, I107, I109, and I111 by means of gates 181 and 183 which control transistor Q67, thereby bringing line 67 to ground at the proper time, with the signals on D103 through D111 corresponding to 103–111 on the timing diagram providing the voltage similarly to W103–W111.

When the period for answering is over the instructor presses the button closing lock and score switch S39, thereby placing a high on one input of gate 133, causing the output to go high, thus removing the ground from one input of gate 131. Gate 131 will then be disabled and the last selected response will remain latched.

If the instructor has selected a correct answer by pressing one of the switches 33 on FIG. 2 a signal corresponding to this selection will appear on line 187. This correct answer signal is generated in a portion of the system not shown by selecting one of the signals 103, 105, 107, 109, or 111 corresponding to the answer selected (for example, if the instructor selects D then the signal selected will be 109) and dividing these pulses in a counter so that a correct answer signal does not appear each time the corresponding signal 109 goes high but only once every fifth or tenth time, for example. In this way the correct answer may be distinguished from the student answer since it will flash rather than remain on at all times. This correct answer signal on line 187 is one input to AND gate 185.

The other AND input is from gate 133 previously discussed. When the output of gate 133 goes high after the switch S39 is closed, AND gate 185 will be enabled and each time a correct answer pulse appears it will be gated to gate 171 and will turn on Q63. Since the correct answer pulse appears during the time a pulse is present on W109, L109 will light each time the correct answer pulse appears. Since the pulse is not present during each cycle, L109 will appear to flash.

For individual mode operation, switch S46 will be closed causing one input of gate 135 to be at ground. When a selection is made the first flip flop in shift register 175 will be set, as explained above. An output from this flip flop, which is a ground when the flip flop is set, provides the other input to gate 135. When both inputs are at ground gate 135 will have a high output. This in turn will cause a high output on gate 133 which will inhibit gate 131 and enable gate 185, as previously noted. Hence, the correct answer signal on input 187 will be immediately gated to Q63 and the corresponding indicator lights L103, L105, L107, L109, or L111 will flash. In this way the student will have simultaneous answer reinforcement since the time between his response and the correct answer being gated to his indicators is so short as to be unnoticeable to the human eye.

The way in which the invention simplifies the selection of groups of students to be displayed to the instructor can be seen by examining gates 181 and 191 and their associated logic. S49 represents the instructor's group selection switch 49 (FIG. 3) and in the position shown is enabling gate 181, allowing the response from the student responder logic shown to be gated through to the indicators. Gate 191 is the corresponding gate from another student responder's logic and has an input 193 which corresponds to the input from gate 183 in the logic shown. If we assume that the logic has been shown for student 1, and that, as shown on FIGS. 2 and 3 and explained above, the instructor may display the responses for sixty students at one time, then the output of gate 191 will represent the first student in the second group, i.e., student 61. Additional gates may be added for additional groups and will in turn represent student 121, 181, etc. Gate 191 drives transistor **Q67*a* whose output is wired through line 198 to line 67. If switch S49 is placed in the position placing a voltage on line 195, the response of student 61 rather than student 1 will be gated through gate 191 and Q67*a* to line 67 and to the instructor's indicators. This results in the requirements of only one jumper wire 198** per student to tie additional student responder logic to the instructor's panel.

Line 199 is the output of the student responder card to the logic for computing and scoring. This logic may also make use of the time shared nature of the information and will be able, in a manner similar to that used in lighting the indicators, to tell from the signal on the one line 199, along with the signals 103 through 111 which are common throughout the system, which response has been selected and use that information in computing and scoring as described in U.S. application Ser. No. 62,382 (Attorney Docket B–2749) filed on even date herewith under common inventorship and assignment.

As can be seen from the above description this system uses a unique method of time sharing which allows the responders to be operated with a minimum number of individual wires, allowing the input to responder cards and the return for all indicators to each be on one line and permitting both the selected response and correct response to be simultaneously displayed using common wiring and logic. It also provides the same indications to the instructor'panel with a minimum of additional logic and has the inherent ability to allow a simple means of selecting groups of students to be displayed. Also it provides a single wire output to the computing and scoring logic in a similar manner.

What is claimed is:

1. Educational teaching apparatus comprising:

a. a plurality of student response devices each having two or more manually operable single pole, two terminal, momentary switches and a visual indicator associated with each switch;

b. a central control unit;

c. a single input wire to said central control unit from each of said response devices connected in common to one terminal of all of said switches;

d. a single output wire from said control unit to each of said response devices connected in common to all of said visual indicators;
e. a number of signal wires equal to the number of said switches on each response device, each of said signal wires corresponding to a particular one of said switches and each of said signal wires connected to the remaining terminal of said switch and its associated indicator lamp in all of said responders;
f. first means associated with said central control unit providing, at high frequency, voltage pulses sequentially to each of said signal wires in a manner such that only one of said signal wires has a voltage on it at one time;
g. second means associated with said central control unit for preselecting one of said switches of each response device as the proper one to be actuated in response to preselected stimuli; and
h. third means responsive to said second means and providing, after operation of any of said responder switches, outputs on said single output wires associated with said responders in which said switches were operated at the same time as said first means is providing an output to the signal wire connected to the indicators corresponding to said proper switch, thereby indicating to the student which switch was the proper one to be actuated.

2. Educational teaching apparatus comprising:
a. a plurality of student response devices each having two or more manually operable single pole, two terminal, momentary switches and a visual indicator associated with each switch;
b. a central control unit;
c. a single input wire to said central control unit from each of said response devices connected in common to one terminal of all of said switches;
d. a single output wire from said control unit to each of said response devices connected in common to all of said visual indicators;
e. a number of signal wires equal to the number of said switches on each response device, each of said signal wires corresponding to a particular one of said switches and each of said signal wires connected to the remaining terminal of said switch and its associate indicator lamp in all of said responders;
f. signal generation means providing, at high frequency, voltage pulses sequentially to each of said signal wires in a manner such that only one of said signal wires has a voltage on it at one time; and
g. a plurality of means equal in number to said plurality of responders having as inputs said single input wires, and responsive to operation of any of said switches on their associated responders and providing an output signal on said single output wires at the same time as said first means is providing an output on the one of said number of signal wires to the indicators corresponding to the one of said switches which has been operated, thereby indicating to the student which switch has been selected.

3. Educational teaching apparatus comprising:
a. a plurality of student response devices each having two or more manually operable single pole, two terminal, momentary switches and a visual indicator associated with each switch;
b. a central control unit;
c. a single input wire to said central control unit from each of said response devices connected in common to one terminal of all of said switches;
d. a single output wire from said control unit to each of said response devices connected in common to all of said visual indicators;
e. a number of signal wires equal to the number of said switches on each response device, each of said signal wires corresponding to a particular one of said switches and each of said signal wires connected to the remaining terminal of said switch and its associated indicator lamp in all of said responders.
f. first means associated with said central control unit providing, at high frequency, voltage pulses sequentially to each of said signal wires in a manner such that only one of said signal wires has a voltage on it at one time;
g. second means associated with said central control unit for preselecting one of said switches of each response device as the proper one to be actuated in response to preselected stimuli;
h. third means responsive to said second means and providing, after operation of any of said responder switches, outputs on said single output wires associated with said responders in which said switches were operated at the same time as said first means is providing an output to the signal wire connected to the indicators corresponding to said proper switch, thereby indicating to the student which switch was the proper one to be actuated; and
i. a plurality of means equal in number to said plurality of responders having as inputs said single input wires, and responsive to operation of any of said switches on their associated responders and providing an output signal on said single output wires at the same time as said first means is providing an output on the one of said number of signal wires to the indicators corresponding to the one of said switches which has been operated, thereby indicating to the student which switch has been selected.

4. The invention according to claim 3 wherein said central control unit contains groups of individual indicator means corresponding to the indicators of each of said response devices, said number of signal wires is connected to one side the corresponding ones of said individual indicator means and a second single output wire from said plurality of means and said third means is provided to the other side of all individual indicators in its associated group.

5. The invention according to claim 3 wherein said second means comprises a multiposition switch corresponding to the switch positions on said response devices.

6. The invention according to claim 3 wherein said plurality of means comprises electrical gating and latching means, one set of said gating and latching means being provided for each of said response devices, each of said sets containing a number of electrical latches equal to the number of manually operable switches on said student response devices, and each latch corresponding to a given one of said switches.

7. The invention according to claim 6 wherein said signal wires are also connected to said plurality of means.

8. The invention according to claim 7 wherein actuation of one of said switches causes a latch in said gating and latching means to latch and to place an output pulse on said single output wire at the same time as a voltage pulse appears on the signal wire means of said first means connected to the indicator lamps in the switch position corresponding to the switch actuated.

9. The invention according to claim 6 and further including an Or gate having as inputs the output of said fourth means and the output of said third means and having an output connected to said single output wire.

10. The invention according to claim 9 where said third means comprises:

a. correct answer input means providing an output signal appearing at the same time said first means is providing an output to the indicator corresponding to the switch preselected by said second means; and b. correct answer gating means connected to said correct answer input means providing an output to said Or gate.

11. The invention according to claim 10 wherein the output of said fourth means causes said indicators to appear to be on constantly and the output of said third means causes said indicators to appear to flash.

12. The invention according to claim 10 wherein said correct answer gating means is responsive to an instructor controlled enabling means whereby said correct answer gating means will have an output only when an output from said enabling means is present.

13. The invention according to claim 12 wherein an absence of an output from said enabling means permits a change of output of said fourth means in response to a new switch operation and wherein the presence of said command disables a change of output of said fourth means.

14. The invention according to claim 13 wherein changes in output of said fourth means are accomplished by shift register means connected to each set of gating and latching means said shift register means advancing each time a latch is set and resetting all latches in a set of gating and latching means when a second latch is set, said reset lasting for only one cycle of voltage pulses from said first means allowing the second latch to set during the next cycle of voltage pulses said pulses being at a frequency such that the student cannot remove his finger in the time required for two cycles.

15. The invention according to claim 14 wherein said enabling means comprises mode selection means connected to the correct answer gating means allowing, in one mode, said gating means to be enabled as soon as the student makes a selection and latches one of the latches in the set of gating and latching means corresponding to his response device in which case the shift register means is disabled after one selection, and, in the other mode, not enabling the correct answer gating means until the instructor commands it enabled thus allowing response selections to be changes for a period of time selected by the instructor.

* * * * *